United States Patent
Dathathraya et al.

(10) Patent No.: US 7,571,429 B2
(45) Date of Patent: Aug. 4, 2009

(54) SYSTEM AND METHOD FOR ERROR REPORTING

(75) Inventors: Sridhar Dathathraya, Cerritos, CA (US); David John Lovat, Huntington Beach, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 870 days.

(21) Appl. No.: 11/037,498

(22) Filed: Jan. 18, 2005

(65) Prior Publication Data

US 2006/0161800 A1    Jul. 20, 2006

(51) Int. Cl.
*G06F 9/45* (2006.01)
(52) U.S. Cl. ..................................... 717/131
(58) Field of Classification Search ................. 717/131
See application file for complete search history.

(56) References Cited

U.S. PATENT DOCUMENTS

| | | | | |
|---|---|---|---|---|
| 5,390,325 A | * | 2/1995 | Miller | 714/38 |
| 5,737,609 A | * | 4/1998 | Reed et al. | 717/126 |
| 6,466,231 B1 | | 10/2002 | Dow et al. | 345/629 |
| 7,124,060 B1 | * | 10/2006 | Eriksson et al. | 702/185 |
| 2004/0015874 A1 | * | 1/2004 | Ungar | 717/127 |

FOREIGN PATENT DOCUMENTS

| | | |
|---|---|---|
| JP | 10301736 | 11/1998 |
| JP | 2004046849 | 2/2004 |
| WO | WO9857260 | 12/1998 |

* cited by examiner

*Primary Examiner*—John Chavis
(74) *Attorney, Agent, or Firm*—Law Office of Gerald Maliszewski; Gerald Maliszewski

(57) ABSTRACT

A system and method are provided for reporting errors in an object-oriented software architecture environment. The method comprises: an application calling an initial method; in response to the initial method call, at least one object encountering an error in response to a subsequent method call; accumulating error information; and, creating a user-defined accumulated error report. Generally, accumulating error information includes: calling an accumulated error reporting object; and, from the accumulated error report object, calling a method for adding received error information to accumulated error information. Then, creating the user-defined accumulated error report includes calling a method for creating an error report text message by: reviewing the accumulated error information; and, matching accumulated error information with user-selected error criteria. Further, creating an error report text message may include calling a method for: recovering a text message associated with each matching error; and, logically presenting the recovered text message errors.

19 Claims, 6 Drawing Sheets

Fig. 6

```
// CSharpNSError the error object to record error info
class ATL_NO_VTABLE CSharpNSError[SD1] :
    public CComObjectRootEx<CComSingleThreadModel>,
    public IDispatchImpl<ISharpNSError, &IID_ISharpNSError,
&LIBID_NSSDKLib>
{
public:
    CSharpNSError()[SD2]
    {
        ...
    }
public:
    STDMETHOD(get_Description)(BSTR *pbstrDescp)[SD3]
    {
        ...
    }

STDMETHOD(get_ErrorCode)(LONG *pErrCode)[SD4]
    {
        ...
    }

STDMETHOD(get_IID)(BSTR *pbstrIID)[SD5]
    {
        ...
    }

STDMETHOD(get_Source)(BSTR *pbstrSource)
    {[SD6]
        ...
    }
    STDMETHOD(RecordErr[SD7])(BSTR bstrDescription,
LONG errCode, BSTR bstrIID, BSTR bstrSource, BSTR bstrHelpFile)
    {
        ...
    }
    STDMETHOD(get_HelpFile)(BSTR *pbstrHelpFile)[SD8]
    {
        ...
    }
private:
    Members removed for clarity
    ...
};
```

Fig. 7

```
class ATL_NO_VTABLE CSharpNSErrors [SD1] :
    public CComObjectRootEx<CComSingleThreadModel>,
    public IDispatchImpl<ISharpNSErrors, &IID_ISharpNSErrors, &LIBID_NSSDKLib>,
    public IErrorInfo
{
public:
    CSharpNSErrors [SD2] ()
    {
    }
public:
    //Interface ISharpNSErrors
    STDMETHOD(get_Item)(LONG lIndex, IDispatch **ppINSErr) [SD3]
    {
        ...
    }
    STDMETHOD(get_Count)(LONG *plCount) [SD4]
    {
        ...
    }
    STDMETHOD(get__NewEnum)(LPUNKNOWN *ppUnknown) [SD5]
    {
        ...
    }
    STDMETHOD(Add)(IDispatch *pError) [SD6]
    {
        ...
    }

//Interface IErrorInfo
    STDMETHOD(GetDescription)(BSTR *pbstrDescription) [SD7]
    {
        ...
    }
}
    STDMETHOD(GetGUID)(GUID *pguid)
    {
        ...
    }
    STDMETHOD(GetHelpContext)(DWORD *pdwHelpContext)
    {
        ...
    }
    STDMETHOD(GetHelpFile)(BSTR *pbstrHelpFile)
    {
        ...
    }
    STDMETHOD(GetSource)(BSTR *pbstrSource)
    {
        ...
    }
    static HRESULT SharpNSReportError(const CLSID& clsid, LPCOLESTR lpszDesc,
const IID& iid, [SD8]
HRESULT hErrCode, HRESULT hr_original_err)
    {
        ...
    }
```

SYSTEM AND METHOD FOR ERROR REPORTING

BACKGROUND OF THE INVENTION

1. Field of the Invention

This invention generally relates to networked-device communications and, more particularly, to a system and method for efficient reporting errors in a network environment.

2. Description of the Related Art

A local area network (LAN) of connected devices may span over the floor of a building, a group of buildings, or may even be connected worldwide. Various hardware interconnections and network protocols may be used. In a small LAN, each user performs the management function of exchanging, adding, or removing devices, installing software, and troubleshooting. However, in a large-scale LAN, a more complicated form of management is required. As in a small LAN, devices still need to be installed or removed, and software updated. A typical LAN may include an Ethernet interface, connected personal computers (PCs), printers, a file server to manage file access, a print server to manage the connected printers, and other peripheral devices. A wide area network (WAN) is an aggregate of LANs connected via a high-speed digital line.

Applications built using the Microsoft component object model (COM) technology rely on the error information provided by the system to supply a user with information concerning any errors that has occurred during a COM interface method call. Unfortunately, COM only permits a single error message to be generated. That is, when a client makes a system call to set the error information, any previous error information is overwritten. A typical COM method call may involve other objects, which in turn make method calls, to implement a particular function. If one of these components (objects) fails, it typically sends error information. Each error message overwrites the previous error message. Thus, only the error message associated with the last component in the chain of components survives. If there is more than one component failure, the information associated with the initially recorded errors is lost. This last-recorded error procedure may lead to insufficient error information being returned from a method call. As a result, it may be difficult for a user to completely identify a problem and resolve it.

A network may connect hardware devices and software products made by a diverse group of manufacturers. For example, an application built using a software development kit (SDK) developed by third-party manufacturers may typically make a call to the SDK to accomplish a printer task such as processing a scanned document received from the scanner. The designers of the SDK would typically like to document all the possible errors that a typical call returns, in case the method fails. A typical SDK method usually uses the available resources, such as system API and any other third-party developed SDKs to accomplish the task. Each of these resources has its own list of error codes returned when such error occurs. It is difficult for the SDK developers to document and manage all possible errors.

OLEDB, an SDK from Microsoft for working with databases, accumulates the error information during a method call, without erasing any previously recorded errors. This permits a user or application developers to iterate through the errors. However, the OLEDB SDK is limited to a very narrow range of functions, and does not extend to architectures. That is, OLEDB SDK does not provide a way for OLEDB to used or extended for use with other SDKs. For example, when reporting an error, it may be desirable for an exemplary SDK to add some custom fields and attributes to the error message. This is not possible with the OLEDB, because the format it very rigid.

It would be advantageous if an SDK existed that permitted third-party component developers to accumulated error augments when executing an object-oriented application.

It would be advantageous if an architecture existed that permitted all occurring errors to be captured during an application programming interface (API) call in a convenient format, to help application developers and end users quickly resolve the problems.

SUMMARY OF THE INVENTION

Accordingly, a method is provided for reporting errors in an object-oriented software architecture environment such as a SDK. The method comprises: an application calling an initial method; in response to the initial method call, at least one object encountering an error in response to a subsequent method call; accumulating error information; and, creating a user-defined accumulated error report.

For example, a COM application may call the initial method. Then, the step of accumulating error information includes: a COM ISupportErrorInfo object receiving a first error information; and, installing an accumulated error reporting object that calls a method for:

adding the first error information to accumulated error information; and replacing the first error information in the COM runtime with the accumulated error information.

More generally, accumulating error information includes: calling an accumulated error reporting object; and, from the accumulated error report object, calling a method for adding received error information to accumulated error information. Then, creating the user-defined accumulated error report includes calling a method for creating an error report text message by:

reviewing the accumulated error information; and matching accumulated error information with user-selected error criteria.

Further, creating an error report text message may include calling a method for: recovering a text message associated with each matching error; and, logically presenting the recovered text message errors.

Additional details of the above-described method and a system for reporting errors in an object-oriented software architecture environment are provided below.

BRIEF DESCRIPTION OF THE DRAWINGS

FIG. 6 is a diagram illustrating the instance of an error.

FIG. 7 is a diagram showing a class that provides support for the error information collection.

DETAILED DESCRIPTION

Figure 1:
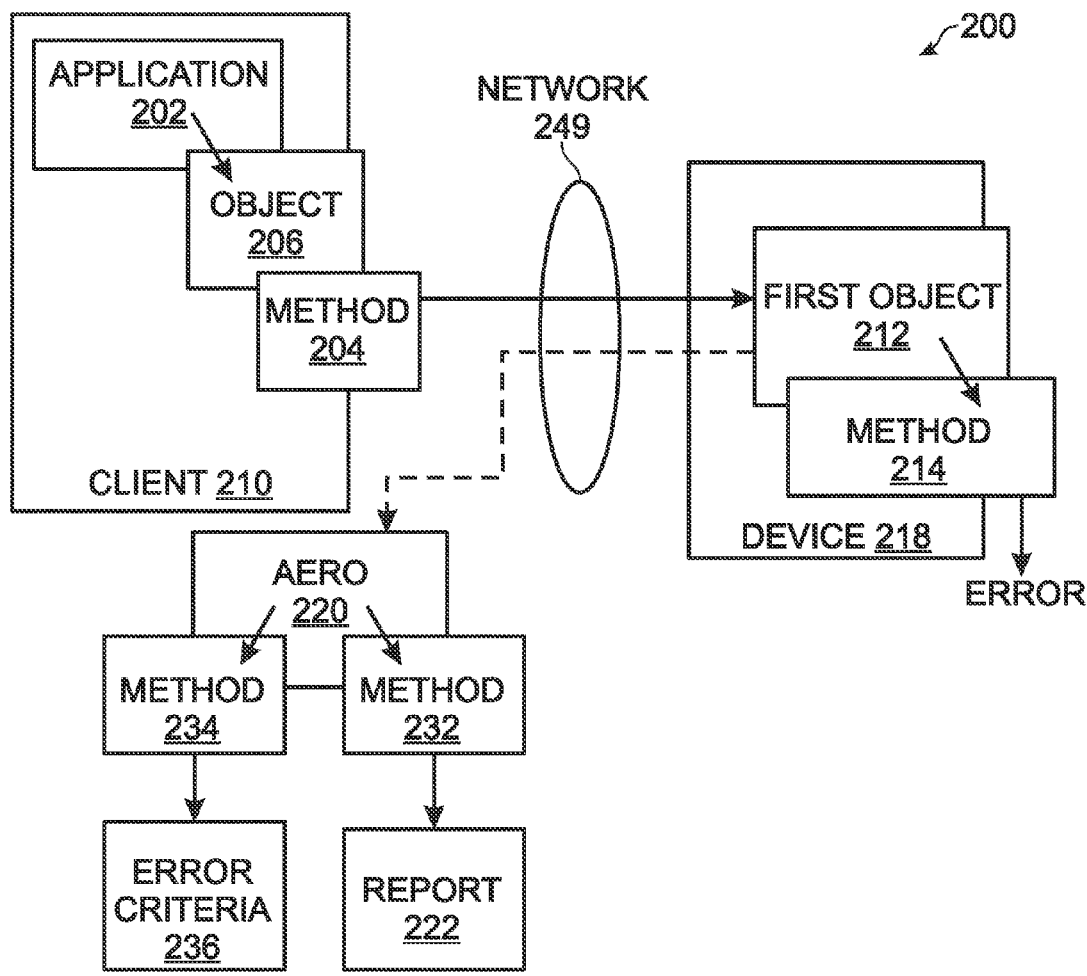
FIGS. 1 and 2 are schematic block diagrams illustrating a system for reporting errors in an object-oriented software architecture environment.
Figure 2:
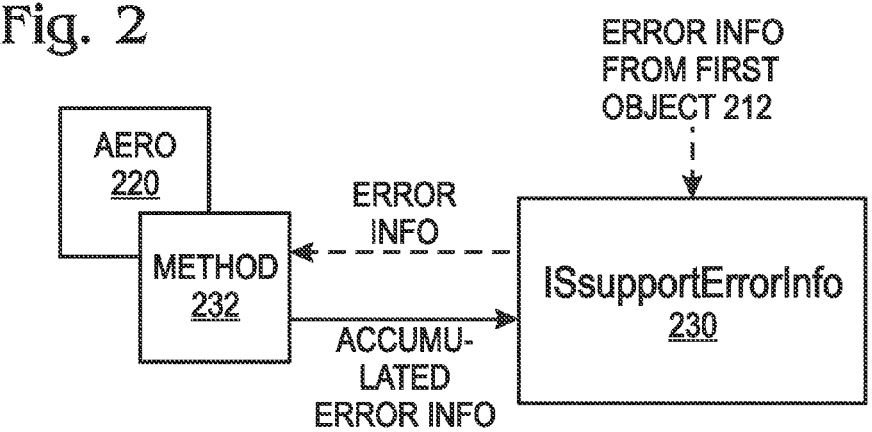

FIGS. 1 and 2 are schematic block diagrams illustrating a system for reporting errors in an object-oriented software architecture environment. Object-oriented programming is a programming process that identifies both a data type and a function (method) that is to be performed on a data structure. That is, the data structure is an object that includes data (attribute) and a function (method). Objects can be easily modularized, which makes software modification and additions easier. Java, C++, Cobol, ACTOR, Eiffel, and Smalltalk are common object-oriented program languages (OOPLs).

Object-oriented software is typically run on a "container" architecture that provides a runtime environment and interface services such as security, transactions, and database access. Examples of common container architectures include COM, common object request broker architecture (CORBA), Jave 2 platform enterprise edition (J2EE), and .NET.

For example, COM is an architecture that is designed to be run on Microsoft Windows operating systems (OSs), such as Windows 95/98 or NT 4.0. Thus, many Window object and Window application objects are built as COM objects. The internal COM objects of an application, such as a word processing application, can be written in such a way as to automatically selected from other objects. In this manner, information from a database can be accessed and inserted into a document, for example.

In FIG. 1 the system 200 comprises an application 202 calling an initial method 204. The application 202, or client program includes at least one (initial) object 206, and an initial method 204 "resides" in the object 206. As shown, the application 202 is embedded as stored software in the memory of a client 210, which may be a PC or network terminal for example. The initial method 204 accesses a first object 212 that calls a subsequent method 214 in response to receiving the initial method call. The first object 212 may reside as a series of software instructions that are loaded into the memory of a network-connected device 218 such as a printer of server. The first object 212 encounters an error in executing the subsequent method call 214, and transmits error information. An accumulated error reporting object (AERO) 220 accumulates error information from the objects, such as first object 212 and creates a user-defined accumulated error report 222. The AERO 220 is shown embedded with the client 210. Alternately but not shown, it may be embedded in any network-connected device. AERO 220 is a novel application programming interface (API) that can be used for more accurately calling error information.

Although only a client 210 and one network-connected device 218 are discussed, it should be understood that the system 200 may comprise a network 249 with a plurality of connected devices. For example, the connected devices can be printer, multifunctional peripherals (MFPs), network servers, or print server. As described above, the application 202 calling the initial method 204 may reside with any of the network-connected devices. The AERO 220 then calls method 232 for creating an error report text message with errors such as network connection errors and device errors.

Figure 2A:
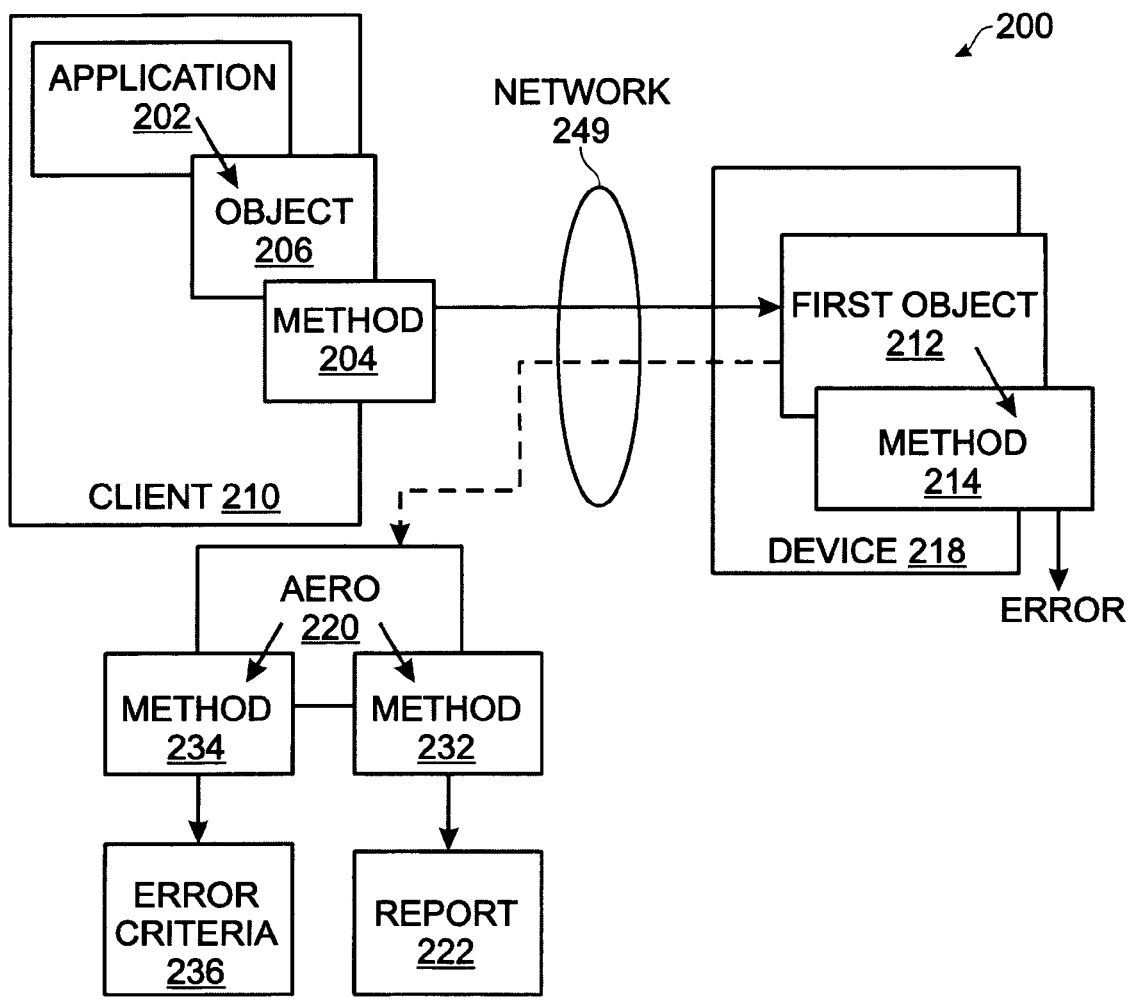
Figure 2B:
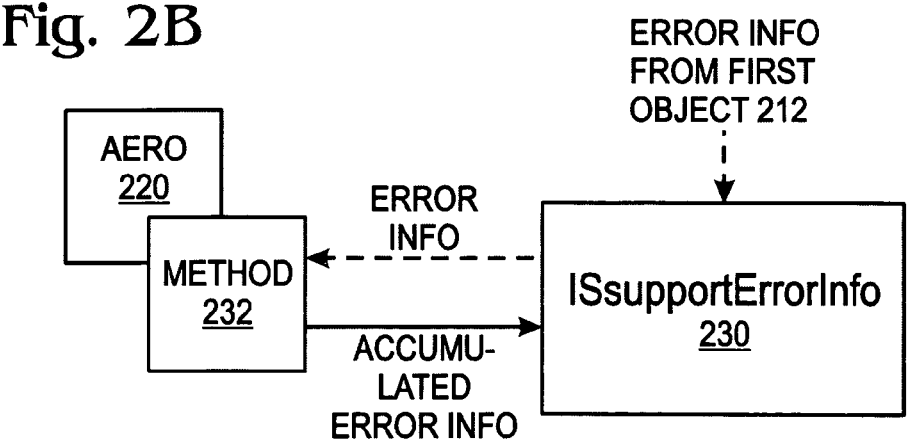

In one aspect, see FIG. 2, the application 202 is a Microsoft™ COM application, meaning that the initial object (206, see FIG. 2A) is a COM architecture object. As is conventional with COM architecture, a COM ISupportErrorInfo object 230 receives transmitted error information, such as from the first object 212. Then, the AERO 220 calls a method 232 for adding received error information to accumulated error information, and replacing error information in the COM runtime with the accumulated error information.

Returning the FIG. 1, AERO 220 is not limited to any particular object-oriented environment. Generally, the accumulated error reporting object 220 calls method 232 for adding received error information to accumulated error information, and for creating an error report text message.

In one aspect, the accumulated error reporting object 220 calls a method 234 for reviewing the accumulated error information and matching accumulated error information with user-selected error criteria 236. Then, the method 232 for creating an error report text message uses the matching error information.

For example, the accumulated error reporting object 220 may call method 232 for creating an error report text message that recovers a text message associated with each matching error, and logically presents the recovered text message errors.

Figure 3:
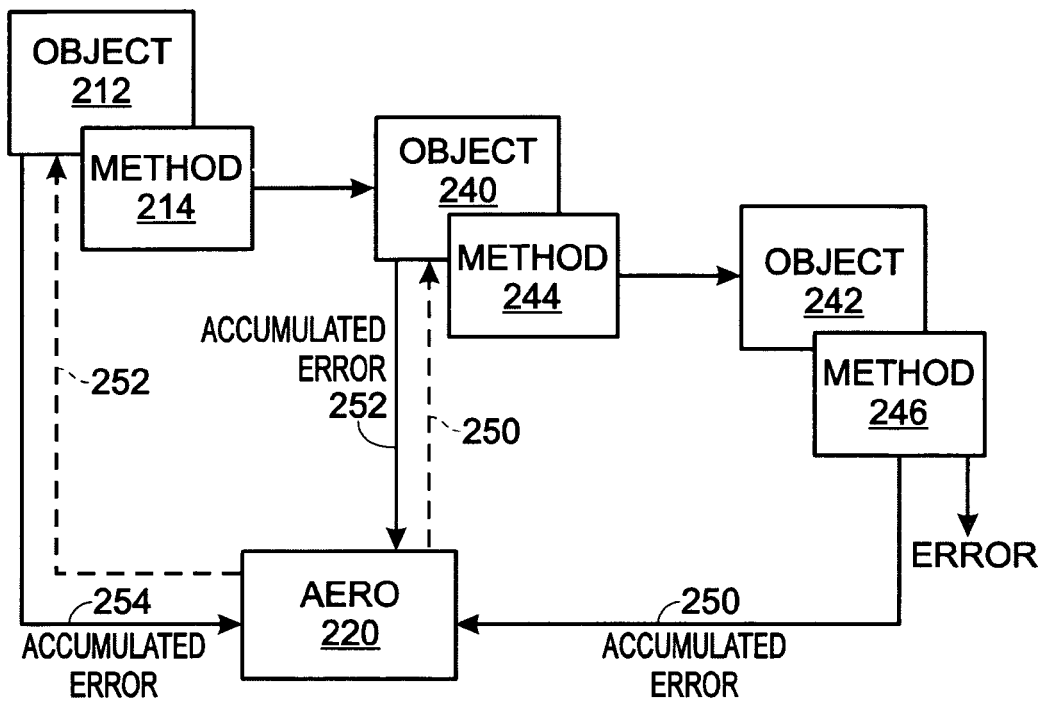
FIG. 3 is a schematic block diagram illustrating a variation of the system 200 of FIG. 1 and 2.

FIG. 3 is a schematic block diagram illustrating a variation of the system 200 of FIGS. 1 and 2. A second plurality of objects 212, 240, and 242 make a first plurality of method calls 214, 244, and 246, respectively. Although only three objects are shown, the system is not limited to any particular number. Likewise, the system 200 is not limited to a single method per object. To continue the example, the system 200 encounters a third plurality of error responses to the calls, and transmits a third plurality of error messages. In this example, the third method 246 encounters an error. Therefore, there is at least one error message associated with method 246.

For example, the second object 240 is called from a first object method 214, and the third object 242 is called from the second object method 244. The accumulated error reporting object 220 receives an accumulated error information 250 from the third object 242. Upon request, the accumulated error information (250) is sent to the second object 240, then the AERO 220 receives accumulated error information 252 updated with second object errors (if any). The AERO 220 sends the accumulated error information 252 to the first object 212, and receives accumulated error information 254 updated with the first object errors (if any).

Returning to FIG. 1, the accumulated error reporting object 220 calls method 234 for matching the third plurality of error messages to user-defined error criteria 236. For example, not all the recorded errors may be of interest to the user. Further, AERO calls method 232 for logically presenting a third plurality of text message errors in the error report text message. For example, method 232 may chronologically organize the text message errors. Alternately, the method may organize the errors by device, serial number, or device manufacturer. In one aspect, the accumulated error reporting object 220 calls method 232 for generating the error report text message in eXtensible Markup Language (XML) format.

Figure 4:
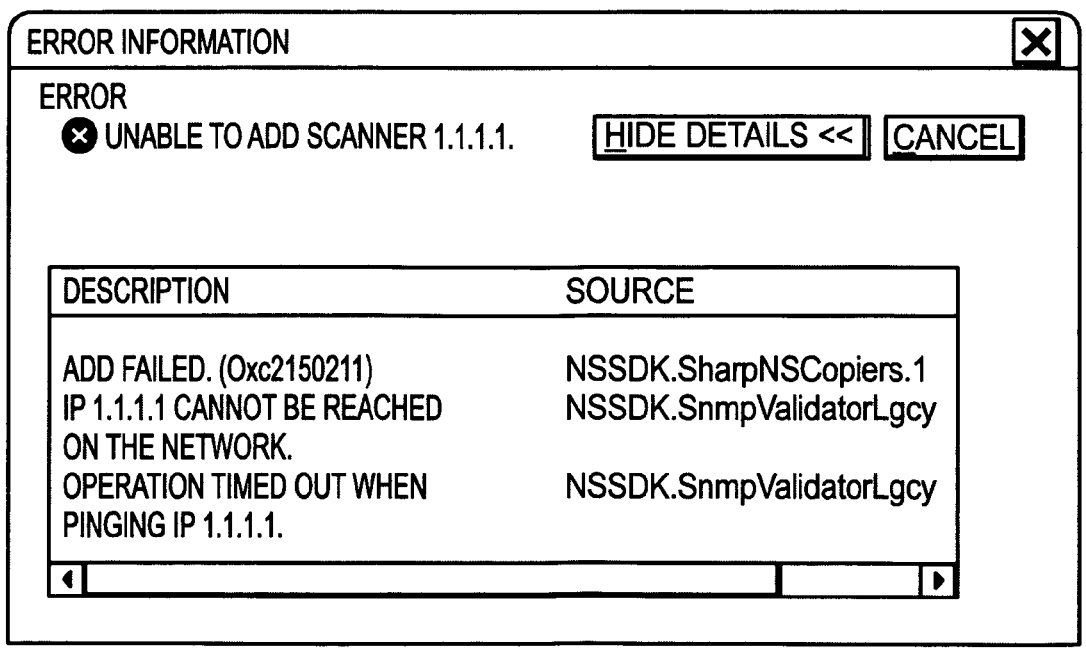
FIG. 4 is a diagram illustrating one implementation of the error report text message.

FIG. 4 is a diagram illustrating one implementation of the error report text message. As shown, the errors from different components are captured and displayed. The report is in a user-friendly text and shows the source of each error. Here, the user is trying to add a copier with the ip 1.1.1.1. This is a bogus ip address and the add will not succeed. As can be seen from the detailed error report, the application first tries to ping the copier ip. That operation fails and a timeout error is returned. One real benefit of the present invention system is in identification the exact reason for the failure of the operation. In this example, the users calls the add method on a SharpNSCopiers object, which fails and returns an error code 0xc2150211. But the actual reason that the copier was not added more properly concerns the ip, which could not be reached. Without the present invention mechanism of capturing all the errors that occur during the course of this operation, it would take a long time for a developer to debug and investigate, to find the exact cause of the problem.

Functional Description

Figure 5:
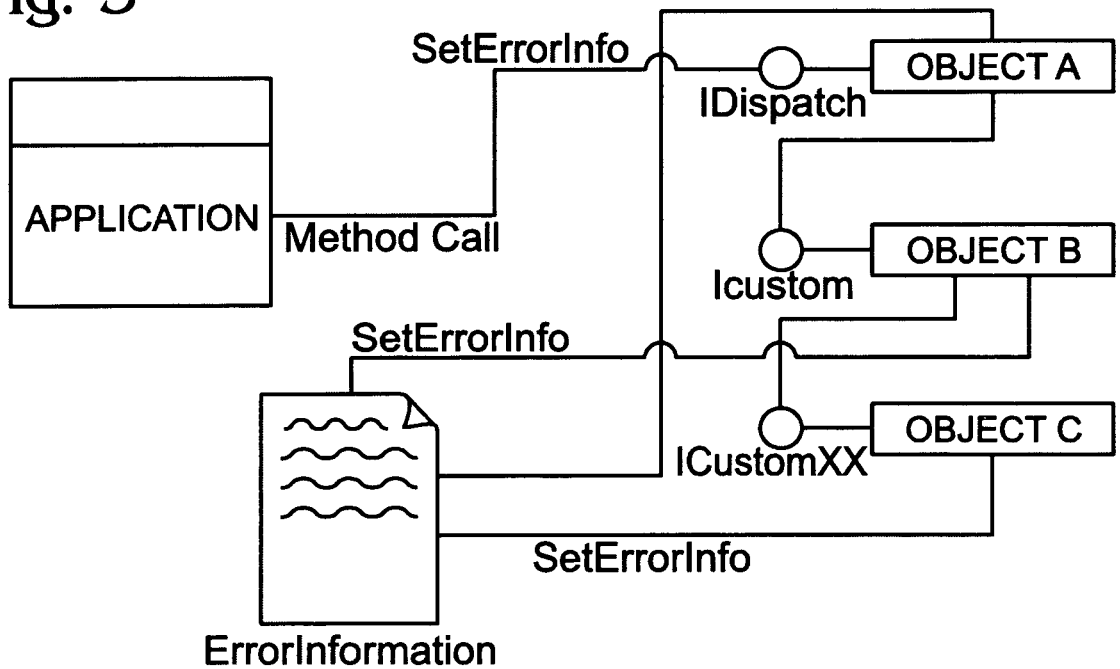
FIG. 5 is a schematic illustrating of a method call.

FIG. 5 is a schematic illustrating of a method call. SDKs built based upon COM use the standard error object interface to set the error information about method call failure. The application makes a method call to object A. Object A calls object B, and B in turn calls Object C. An error occurs in object C, which uses the standard COM error reporting mechanism to set the error information concerning the failed method, and returns an error code to the caller B. Object B retrieves the error information from the COM and updates the error information with its own specific error data. Object B calls the SetErrorInfo, which overwrites the previous error information and returns the error code to object A. That is, error information is communicated to a client using an API called SetErrorInfo. This particular API overwrites any previous error information when recording the Object B error information. Object A, in turn, updates the error information with its own error data. Object A then calls the SetErrorInfo to replace the previous error with the updated error object, which now contains the cumulative result of all the calls. This detailed error list helps the users in resolving the error condition more quickly.

FIG. 6 is a diagram illustrating the instance of an error. This functionality is implemented using the C++ language and COM technology. The class CSharpNSError represents an instance of an error (SD1). The code fragment shows the structure of this class. The implementation details of this class are removed for clarity. CSharpNSError is the default constructor of this class (SD2). At SD3, the method returns a description of the error. At SD4 the method returns the error code. At SD5 the method returns the interface ID that was used in the call. At SD6 the method returns the line number where the error occurred. At SD7 the method records the error information. AT SD8 the method returns any help files associated with the error.

FIG. 7 is a diagram showing a class that provides support for the error information collection. The implementation code is removed for clarity. The class CSharpNSErrors represents an instance of an error (SD1). CSharpNSErrors is the constructor of this class (SD2). At SD3, the method returns a specific error object identified by the index. At SD4 the method returns the number of errors in the error collection. At SD5 the method returns the enumerator object. The enumerator object includes methods for navigating the collection. At SD6 the method adds an error object (AERO) to the collection of errors. At SD7 the method returns a description of the error. AT SD8 appends error information to the error object.

Figure 8:
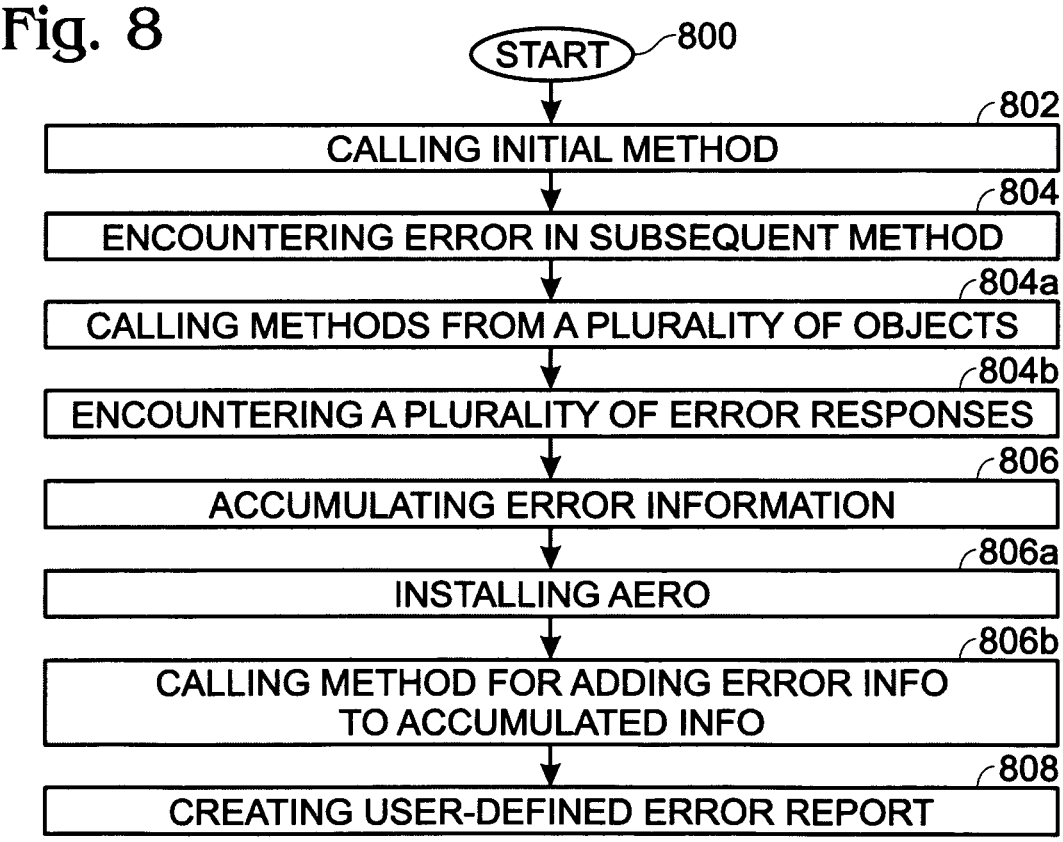
FIG. 8 is a flowchart illustrating a method for reporting errors in an object-oriented software architecture environment.

FIG. 8 is a flowchart illustrating a method for reporting errors in an object-oriented software architecture environment. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800.

In Step 802 an application calls an initial method. For example, the application can be an SDK. In Step 804 at least one object called by the initial method encounters an error in response to a subsequent method call. Step 806 accumulates error information. Step 808 creates a user-defined accumulated error report.

In one aspect accumulating error information in Step 806 includes substeps. Step 806*a* calls an accumulated error reporting object (AERO). From the accumulated error reporting object, Step 806*b* calls a method for adding received error information to accumulated error information. That is, AERO is an API that retrieves error information, appends this information to any previously existing error information, and sets the updated information in the system. Then, creating the user-defined accumulated error report in Step 808 includes calling a method for creating an error report text message.

For example, if Step 802 is a Microsoft™ Component Object Model (COM) application calling the initial method, then accumulating error information in Step 806 includes a COM ISupportErrorInfo object receiving a first error information. Step 806*a* installs an accumulated error reporting object (AERO) and Step 806*b* calls a method for adding the first error information to accumulated error information, and replacing the first error information in the COM runtime with the accumulated error information.

In another aspect, creating an error report text message (Step 808) includes calling a method for: reviewing the accumulated error information; and, matching accumulated error information with user-selected error criteria. In a different aspect, creating an error report text message includes calling a method for: recovering a text message associated with each matching error; and, logically presenting the recovered text message errors.

For example, Step 808 may logically present the recovered text messages by chronologically organizing the text message errors. The error report text message may be generated in eXtensible Markup Language (XML) format. However, the method is not limited to any particular type of format.

In one aspect, encountering an error in response to a subsequent method call in Step 804 includes substeps. Step 804*a* makes a first plurality of method calls from a second plurality of objects. Step 804*b* encounters a third plurality of error responses to the calls. Step 806 matches the third plurality of error responses to user-defined error criteria, and Step 808 logically presents a third plurality of text message errors.

More specifically, making the first plurality of method calls from the second plurality of objects in Step 804*a* may include: calling a second object from a first object method; and, calling a third object from a second object method. Then, accumulating error information in Step 806 includes: the second object retrieving any error information associated with the third object, adding its own error information, and storing the accumulated error information. Then, the first object retrieves any error information associated with the second object, adds its own error information, and stores the accumulated error information.

In another aspect, Step 802 may call the initial method from an application in a network of connected devices. Then, calling a method for creating an error report text message (Step 806*b*) includes reporting errors such as network connection errors and device errors.

A system and method have been provided for reporting errors in a network using an object-oriented architecture. Examples of the inventions have been providing in the context of COM architecture, to help illustrate the invention. However, the invention is not limited to merely this architecture. Other variations and embodiments of the invention will occur to those skilled in the art.

We claim:

1. A computer storage medium tangibly employing a program of machine-readable operations executed by a digital processing apparatus for reporting errors in a network of connected computing devices the operations comprising:

an application, embedded as stored software in a memory of a client computing device, calling an initial method;

at least one object, embedded as software instructions in a computing device that is network-connected to the client computing device, called by the initial method encountering an error in response to a subsequent method call;

accumulating error information as follows:

calling an accumulated error reporting object embedded as stored software in a memory of a network-connected computing device:

from the accumulated error report object, calling a method for adding received error information to accumulated error information; and, creating a user-defined accumulated error report in response to the accumulated error report object calling a method for creating an error report text message.

2. The operations of claim 1 wherein calling the initial method includes a Microsoft™ Component Object Model (COM) application calling the initial method; and wherein accumulating error information includes:

a COM ISupportErrorInfo object receiving a first error information;

adding the first error information to accumulated error information; and replacing the first error information in the COM runtime with the accumulated error information.

3. The operations of claim 1 wherein creating an error report text message includes calling a method for:

reviewing the accumulated error information; and matching accumulated error information with user-selected error criteria.

4. The operations of claim 3 wherein creating an error report text message includes calling a method for:

recovering a text message associated with each matching error; and logically presenting the recovered text message errors.

5. The operations of claim 4 wherein encountering an error in response to a subsequent method call includes:

making a first plurality of method calls from a second plurality of objects; and encountering a third plurality of error responses to the calls;

wherein accumulating error information includes matching the third plurality of error responses to user-defined error criteria; and wherein creating an error report text message includes logically presenting a third plurality of text message errors.

6. The operations of claim 5 wherein making the first plurality of method calls from the second plurality of objects includes:

calling a second object from a first object method; and calling a third object from a second object method;

wherein accumulating error information includes:

the second object retrieving any error information associated with the third object, adding its own error information, and storing the accumulated error information; and the first object retrieving any error information associated with the second object, adding its own error information, and storing the accumulated error information.

7. The operations of claim 4 wherein logically presenting the recovered text messages includes chronologically organizing the text message errors.

8. The operations of claim 4 wherein creating an error report text message includes generating the report in eXtensible Markup Language (XML) format.

9. The operations of claim 1 wherein calling a method for creating an error report text message includes reporting errors selected from the group including network connection errors and device errors.

10. A system for reporting errors in a network of connected computing devices, the system comprising:

a client computing device executing an application embedded as software instructions stored in a tangible memory by calling an initial method;

a first computing device, network-connected to the client computing device, executing software instructions stored in a tangible memory by:

accessing a first object in response to receiving the initial method call;

calling a subsequent method in response to receiving the initial method call;

encountering an error in executing the subsequent method call; and transmitting error information; and wherein a network-connected computing device executes an accumulated error reporting object embedded as software instructions stored in a tangible memory for:

accumulating error information from the first object;

adding received error information to the accumulated error information; and, creating a user-defined accumulated error report text message.

11. The system of claim 10 wherein the application embedded in the client computing device is a Microsoft™ Component Object Model (COM) application;

wherein a COM ISupportErrorInfo object receives the transmitted error information; and wherein the accumulated error reporting object calls a method for adding received error information to accumulated error information, and replacing error information in the COM runtime with the accumulated error information.

12. The system of claim 10 wherein the accumulated error reporting object calls a method for reviewing the accumulated error information and matching accumulated error information with user-selected error criteria, and calls a method for creating an error report text message using the matching error information.

13. The system of claim 12 wherein the accumulated error reporting object calls a method for creating an error report text message by recovering a text message associated with each matching error and logically presenting the recovered text message errors.

14. The system of claim 13 further comprising:

a plurality of network-connected computing devices, each device executing software instruction stored in a tangible memory for accessing an object, each object making a method call, encountering an error response to the call, and transmitting an error message; and wherein the accumulated error reporting object calls a method for matching the plurality of error messages to user-defined error criteria, and calls a method for logically presenting a plurality of text message errors in the error report text message.

15. The system of claim 14 wherein a second network-connected computing device executes software instructions stored in a tangible memory for accessing a second object called from a first object method;

wherein a third network-connected computing device executes software instructions stored in a tangible memory for accessing a third object called from a second object method;

wherein the accumulated error reporting object:
receives accumulated error information from the third object;
sends the accumulated error information the second object;
receives accumulated error information updated with second object errors;
sends the accumulated error information to the first object; and
receives accumulated error information updated with the first object errors.

16. The system of claim 14
wherein the accumulated error reporting object calls a method for creating an error report text message with errors selected from the group including network connection errors and device errors.

17. The system of claim 13 wherein the accumulated error reporting object calls a method for chronologically organizing the text message errors.

18. The system of claim 13 wherein the accumulated error reporting object calls a method for generating the error report text message in eXtensible Markup Language (XML) format.

19. A computer storage medium tangibly employing a program of machine-readable operations executed by a digital processing apparatus for reporting errors in a network of connected computing devices, the operations comprising:

a Microsoft™ Component Object Model (COM) application, embedded as stored software in a memory of a client computing device, calling an initial method;

at least one object, embedded as software instructions in a computing device that is network-connected to the client computing device, called by the initial method encountering an error in response to a subsequent method call;

accumulating error information as follows:

calling an accumulated error reporting object embedded as stored software in a memory of a network-connected computing device;

from the accumulated error report object, calling a method for adding received error information to accumulated error information; and, creating a user-defined accumulated error report in response to the accumulated error report object calling a method for creating an error report text message, the accumulating error information including:

a COM ISupportErrorInfo object receiving a first error information;

adding the first error information to accumulated error information; and replacing the first error information in the COM runtime with the accumulated error information.

* * * * *